United States Patent [19]
Hartzell et al.

[11] 3,861,945
[45] Jan. 21, 1975

[54] PHOTOPOLYMERIZATION OF PIGMENTED ACTINIC LIGHT-SENSITIVE COMPOSITIONS

[75] Inventors: Rowland S. Hartzell, Gibsonia; Ernest A. Hahn, Pittsburgh, both of Pa.

[73] Assignee: PPG Industries, Inc., Pittsburgh, Pa.

[22] Filed: Apr. 20, 1971

[21] Appl. No.: 135,798

[52] U.S. Cl. ... 117/93.31, 117/161 K, 117/161 UC, 204/159.22, 204/159.24, 260/40 R, 260/41 R
[51] Int. Cl. ...... B44d 1/50, C08f 3/42, C08f 11/02
[58] Field of Search ...... 117/93.31, 161 K, 161 UC; 204/159.23, 159.24, 159.22; 252/301.3; 23/135; 260/40 R, 41 R

[56] References Cited
UNITED STATES PATENTS

| | | | |
|---|---|---|---|
| 2,914,404 | 11/1959 | Fanselau et al. | 117/93.31 |
| 3,147,119 | 9/1964 | Evans et al. | 117/93.31 |
| 3,346,383 | 10/1967 | Baxendale et al. | 204/159.24 |
| 3,558,387 | 1/1971 | Bassemir et al. | 117/93.31 |
| 3,677,763 | 7/1972 | DeBoer et al. | 117/93.31 |

OTHER PUBLICATIONS
Kachan et al. "Chem. Abstracts" 45, 19818d (1966).

*Primary Examiner*—William D. Martin
*Assistant Examiner*—John H. Newsome
*Attorney, Agent, or Firm*—George D. Morris

[57] ABSTRACT

Actinic light-sensitive resins containing white pigments which reflect at least 15 percent actinic light are cured by subjecting the compositions to actinic light having a wave length range of 2,200 to 3,800 angstroms. The process of curing the pigmented compositions is especially useful in filling porous substrate materials to obtain a uniform surface thereon which masks the original appearance of the substrate.

10 Claims, No Drawings

PHOTOPOLYMERIZATION OF PIGMENTED ACTINIC LIGHT-SENSITIVE COMPOSITIONS

In the preparation of many wood products such as furniture and the like, although the surface must be strong and decorative, the bulk of the product consists of a substrate material usually hardboard or particle board or natural wood which is relatively inexpensive but generally rough and unsightly. The substrate material, which is sometimes referred to as a core material, of course, must be coated to produce both a protective and a decorative effect.

The substrate material, however, is quite porous and non-uniform and in order to coat the substrate material it is first necessary to fill these pores so that the surface will be uniform. This is done by forcing pigmented compositions into the pores of the substrate and curing the pigmented compositions. This is generally done in two coats in the prior art as the curing of most thick pigmented compositions is somewhat difficult. The filled material is then coated with a ground coat and a top coat.

It has been discovered that an actinic light-sensitive material containing white pigment which has at least 15 percent reflectance to actinic light and, optionally, inert pigments having at least 15 percent reflectance to actinic light when used as filler material for substrate materials may be cured by actinic light in the wave length range of 2,200 to 3,800 angstroms to cure using only one coat to produce a uniform surface which completely hides the grain of the substrate material so as to eliminate the need for a ground coat and a second filler coat.

That the pigmented material may be cured with actinic light at any appreciable thickness is quite unexpected, as the actinic light curing of polymers is generally limited to clear and usually transparent materials. To hide the substrate, however, pigments must be added. Most pigmented actinic light-sensitive materials will polymerize only at the immediate surface when subjected to actinic light. The remainder of the film will remain wet and completely uncured. For example, ultra-violet sensitive vehicles pigmented even to a slight degree with titanium dioxide will only polymerize at the surface in ultra-violet light. It has now been found, however, that white pigments such as antimony trioxide, lithopone, and lead carbonate, and optionally inert pigments such as ultramarine blue, calcium carbonate, barium sulfate, aluminum silicate, calcium silicate, talc, and silica which have reflectances of over 15 percent in actinic light, in the range specified, may be used with actinic lightsensitive materials and subjected to actinic light to cure producing films which are opaque to the visible light.

The method of this invention entails curing an actinic light-sensitive coating composition containing pigments which are highly reflective in actinic light by subjecting to actinic light in the wave length range of 2,200 - 3,800 angstroms.

The actinic light-sensitive material used in this invention may be any actinic light-sensitive, curable, organic material. The most useful organic materials to be used are polyester resins and acrylic resins.

The polyester resins comprise unsaturated polyesters, solubilized in vinyl monomers. The unsaturated polyesters are ordinarily mixtures of alpha-beta ethylenically unsaturated polycarboxylic acids and polyhydric alcohols.

The ethylenically unsaturated polycarboxylic acids include such acids as:
maleic acid
fumaric acid
aconitic acid
mesaconic acid
citraconic acid
itaconic acid and halo and alkyl derivatives of such acids and the like; the preferred acid being maleic acid. The anhydrides of these acids, where the anhydrides exist, are, of course, embraced under the term "acid", since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:
ethylene glycol
diethylene glycol
triethylene glycol
polyethylene glycol
propylene glycol
dipropylene glycol
polypropylene glycol
glycerol
neopentyl glycol
pentaerythritol
trimethylol propane
trimethylol ethane and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyesters. Such acids increase the length of the polyester without adding additional crosslinking sites, which is a desired feature in some polyesters. Examples of useful dicarboxylic acids which are either saturated or only aromatically unsaturated include:
succinic acid
adipic acid
suberic acid
azelaic acid
sebacic acid
isophthalic acid
terephthalic acid
tetrachlorophthalic acid and the like. As in the case of the ethylenically unsaturated acids, the anhydrides of these acids, where the anhydrides exist, are, of course, embraced in the term acid, since the polyesters obtained therefrom are the same. Furthermore, for purposes of the present invention, the aromatic nuclei of such acids as phthalic acid are generally regarded as saturated since the double bonds do not react by addition, as do ethylenic groups.

Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Vinyl monomers which crosslink with unsaturated polyesters to form thermosetting materials may be interpolymerized with the acrylic compounds and polyesters, if desired. Such vinyl monomers may include:
styrene
alpha-methylstyrene
divinylbenzene
diallyl phthalate
methyl acrylate
methyl methacrylate
hexyl acrylate
octyl acrylate
octyl methacrylate
diallyl itaconate
diallyl maleate
and the like. The preferred vinyl monomers are liquid compounds, soluble in the polyester components. Such monomers should preferably be free of non-aromatic carbon-carbon conjugated double bonds.

The vinyl monomer as exemplified in the above list may be employed over a broad range, but usually the proportion thereof, upon a weight basis, will be less than the polyester component. The amount of monomer should be sufficient to provide a liquid flowable, interpolymerizable mixture. Ordinarily, the percentage of monomer will fall within the range of about 10 percent to about 60 percent by weight of the total mixture of polyester and monomer.

The preferred polyester resins are those formed from polyesters of propylene glycol as the diol and maleic acid and phthalic acid as the carboxylic acids with styrene or diallyl phthalate or vinyl toluene as the solubilizing monomer.

The acrylic compositions which may be used as the actinic light-sensitive materials in this invention may be esters or amides of acrylic or methacrylic acid or comonomers of such an ester with another copolymerizable monomer. Suitable esters include those of alcohols containing 1 to 8 carbon atoms such as methyl acrylate, methyl methacrylate, ethyl acrylate, butyl methacrylate, octyl acrylate and 2-ethoxy ethyl methacrylate. Suitable amides include acrylamide, methacrylamide, tertiary butyl acrylamide and primary alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, for example, itaconate esters, maleate esters and allyl compounds, alkylene dimethacrylates and diacrylates, such as 1,3-butylene dimethacrylate, and the like, and triacrylates and trimethacrylates, such as trimethyl propane trimethacrylate, and the like, may also be used. The preferred acrylates are polyacrylates and methacrylates, such as diacrylates, dimethacrylates, tri-acrylates, trimethacrylates, and the like, such as acryloxy pivalyl acryloxy pivalate, bis-(acryloxyethyl)hexahydrophthalate, bis-(acryloxy ethyl)phthalate and the like. Examples of these materials are found in U.S. Pat. No. 3,455,802.

The actinic light-sensitive materials herein contain a pigment or pigments which are highly reflective to actinic light.

The pigments contained in the actinic light-sensitive binder must have at least 15 percent reflectance in actinic light. This means that for a hiding pigment to be useful it must reflect a minimum of 15 percent of an incident actinic ray somewhere betwee 2,200 and 3,800 angstroms.

Some examples of white pigments having at least 15 percent reflectance in actinic light are antimony trioxide lithopone, lead carbonate and the like. All of these materials have reflectances of at least 15 percent somewhere between 2,200 and 3,800 angstroms. This is contrasted to materials such as titanium dioxide which has a reflectance of 8 percent at 3,000 angstroms, 7 percent at 3,250 angstroms, 7 percent at 3,500 angstroms, and 9 percent at 3,750 angstroms. It is noted that at least one pigment in the composition must be a white pigment having at least 15 percent reflectance in actinic light from 2,200 to 3,800 angstroms.

The percent reflectance of hiding pigments is measured by the standard technique. The preferred spectrophotometer is the Beckman Model DU Spectrophotometer. Using this apparatus a 45° mirror in a heavy casting directs a beam of light from a monochromater downwards on to the horizontal surface of the sample being tested. The rays leaving the illuminated surface at angles of reflection between approximately 35° and 55° are focused by a ring-shaped segment of an ellipsoidol mirror upon a frosted quartz diffusing screen lying in the field in view of the photo tube which is attached to the upper horizontal surface of the casting. The measurement is made by first adjusting the spectrophotometer to read 100 percent relative reflectance on a white standard (ASTM-E 259) and then sliding the drawer to bring the unknown sample into the beam. The relative reflectance or percent reflectance is read from the transmission density scale.

The above pigments must also have a minimum hiding effect in order to be useful herein.

The amount of hiding effect a pigment has is determined by its reflectance in the visible range, that is, over 4,000 angstroms and its index of refraction. The higher the percent reflectance of the pigment in the visible light range the more hiding effect the pigment has. Thus, the pigments useful in this invention, are those which not only reflect greater than 15 percent in the lower range such as 2,200 to 3,800 angstroms, but show a sharp increase in reflectance in the visible range. Most white and other hiding pigments show very low reflectance in the actinic light range of 2,200 to 3,800 angstroms and then increase sharply in the visible light range.

To achieve the minimum hiding the pigment to binder ratio may vary greatly but it is preferred that the composition have a pigment to binder ratio of from about 0.5:1 to about 5:1 as very little hiding effect is accomplished at less than 0.5:1 pigment to binder and the curing time for the composition becomes uneconomical at ratios of 5:1 and higher.

It is noted that small amounts of pigments having reflectances of less than 15 percent in actinic light may also be used. Generally no more than about 5 percent of the total pigments used may have less than 15 percent reflectance to actinic light. Pigments having extremely low reflectance to actinic light such as titanium dioxide and carbon black can be used in minute quantities if at all.

The coating compositions must contain photosensitizers to aid in the actinic light curing of the composition. Various common photosensitizers are benzoin, benzoin methyl ether, diphenyl disulfide, dibenzyl disulfide, benzil, and the like. Generally the coating may comprise from about 0.1 percent by weight of the photosensitizer to about 5 percent by weight of the photosensitizer.

The composition is cured by subjecting to actinic light in the wave length range of 2,200 to 3,800 angstroms. Various suitable sources of the actinic light are available in the art including by way of example, quartz mercury lamps, ultra-violet cored carbon arcs, and high-flash lamps.

The length of exposure to the actinic light and the intensity of the source may be varied greatly. The treatment is continued until the composition is cured to a hard, uniform state.

The method outlined above is especially useful in filling porous substrate materials. The porous material is filled with the composition and the composition is cured by actinic light in the wave length range of 2,500 – 3,800 angstroms.

The substrate material or core material provides the bulk of the finished product and, therefore, inexpensive material such as chipboard, hardboard or lumber is preferred. Any conventional core material, however, such as plywood fiberboard, gypsum board, or the like, may be used. The substrate material which is most often a wood product may vary in thickness, depending upon the dimensions of the finished article. The face material of the core is generally decorated and protected by a coating. Thus, the finished face material may be capable of resisting stains, abrasion, and must have a smooth decorative surface so as to be useful as a table top or a like material.

These decorative finished articles are very useful as furniture material, such as table tops, desk tops, cabinet components, chair trim, and the like, but may also be used for counter tops, wall coverings, floor coverings, and the like.

The following examples set forth specific embodiments of the instant invention. The invention, however, is not to be construed as being limited to these embodiments, for there are, of course, numerous possible variations and modifications. All parts and percentages in the examples, as well as throughout the specification, are by weight unless otherwise indicated.

EXAMPLE 1

An actinic light-sensitive composition containing pigments having a reflectance of greater than 15 percent in actinic light was prepared as follows:

A pigment paste comprising 136.98 parts of a polyester formed from propylene glycol, maleic acid and phthalic acid, 10.54 parts of styrene monomer, 8.43 parts of a tinting pigment of indofast yellow pigment (having a reflectance of 6 percent at 3,000 angstroms, 10 percent at 3,250 angstroms, 7 percent at 3,500 angstroms and 7 percent at 3,750 angstroms), 0.53 part of indofast scarlet pigment (having a reflectance of 5 percent at 3,000 angstroms, 6 percent at 3,250 angstroms, 8 percent at 3,500 angstroms and 7 percent at 3,750 angstroms), 4.22 parts of graphite pigment (having a reflectance of 4 percent at 3,000, 3,250, 3,500 and 3,750 angstroms) and 69.54 parts of barium sulfate, zinc oxide and zinc sulfide mixture (lithopone) (having aa reflectance of only 4 percent at 3,000 angstroms, 6 percent at 3,250 angstroms, but 42 percent at 3,500 angstroms and 80 percent at 3,750 angstroms) was ground in a steel ball mill.

To 230.24 parts of the ground paste were added 16.86 parts of styrene monomer. A tank was charged 247.10 parts of the paste, 357.20 parts of the propylene maleate phthalate polyester and 25.18 parts of diisobutyl ketone. To the blend was added 541.59 parts of calcium carbonate (having a reflectance of 77 percent at 3,000 angstroms, 81 percent at 3,250 angstroms, 84 percent at 3,500 angstroms, and 89 percent at 3,750 angstroms) and 281 parts of aluminum silicate (having a reflectance of 39 percent at 3,000 angstroms and 67 percent and 3,750 angstroms). The mixture was tinted with 3.16 parts of a paste of 10 percent indofast scarlet pigment in 90 percent of the polyester and 5.27 parts of a paste of 15 percent graphite pigment in 85 percent of the polyester.

To the above pigmented composition was added 5 percent by volume of a catalyst comprising 100.10 parts of benzoin methyl ether and 666.90 parts of ethylene glycol mono butyl ether and the composition was cured by subjecting to ultra-violet light for 6 passes at a speed of 30 feet per minute. The resulting material was cured to a hard state.

EXAMPLE 2

An actinic light-sensitive composition containing pigments have a reflectance of greater than 15 percent in actinic light was prepared as follows:

A pigment paste comprising 136.98 parts of a polyester formed from propylene glycol, maleic acid and phthalic acid 10.54 parts of styrene monomer, 8.43 parts of a tinting pigment of indofast yellow pigment (having a reflectance of 6 percent at 3,000 angstroms, 10 percent at 3,250 angstroms, 7 percent at 3,500 angstroms and 7 percent at 3,750 angstroms), 0.53 part of indofast scarlet pigment (having a reflectance of 5 percent at 3,000 angstroms, 6 percent at 3,250 angstroms 8 percent at 3,500 angstroms and 7 percent at 3,750 angstroms), 4.22 parts of graphite pigment (having a reflectance of 4 percent at 3,000, 3,250, 3,500 and 3,750 angstroms) and 69.54 parts of antimony trioxide (having a reflectance of 25 percent at 3,000 angstroms, 45 percent at 3,250 angstroms, but 65 percent at 3,500 angstroms and 75 percent at 3,750 angstroms) was ground in a steel ball mill.

To 230.24 parts of the ground paste were added 16.86 parts of styrene monomer. A tank was charged 247.10 parts of the paste, 357.20 parts of the propylene maleate phthalate polyester and 25.18 parts of diisobutyl ketone. To the blend was added 541.59 parts of calcium carbonate (having a reflectance of 77 percent at 3,000 angstroms, 81 percent at 3,250 angstroms, 84 percent at 3,500 angstroms, and 89 percent at 3,750 angstroms) and 281 parts of aluminum silicate (having a reflectance of 39 percent at 3,000 angstroms, 43 percent at 3,250 angstroms, 35 percent at 3,500 angstroms and 67 percent and 3,750 anstroms). The mixture was tinted with 3.16 parts of a paste of 10 percent indofast scarlet pigment in 90 percent of the polyester and 5.27 parts of a paste of 15 percent graphite pigment in 85 percent of the polyester.

To the above pigmented composition was added 5 percent by volume of a catalyst comprising 100.10 parts of benzoin methyl ether and 666.90 parts of ethylene glycol mono butyl ether and the composition was cured by subjecting to ultra-violet light for 6 passes at a speed of 30 feet per minute. The resulting material was cured to a hard state.

EXAMPLES 3-4

Two actinic light-sensitive compositions containing pigments having a reflectance of greater than 15 percent in actinic light were prepared as follows:

A pigment paste comprising 64 parts of Lithopone pigment and 36 parts of hexahydrophthalic ethylene glycol diacryvlate was ground in a Cowles dissolver set at 7 NS fineness.

To 94 parts of the above pigment paste were added 25 parts hexahydrophthalic ethylene glycol diacrylate and 0.9 part of a mixture of benzoyl butyl ether and benzoyl amyl ether and the composition was drawn down on cold-rolled steel using a No. 0.018 wire wound draw bar. The coating was cured by passing under a mercury high pressure ultra-violet lamp in a nitrogen gas atmosphere at a speed of 50 feet per minute for one pass.

A similar coating was made using antimony trioxide as the pigment wherein the Cowles dissolver was set at 6 ½ NS fineness. These materials wherein the pigments have a reflectance of greater than 15 percent in actinic light were compared to the same coating using $TiO_2$ pigment and using 105 parts of the radiation sensitive material rather than 94 and wherein the Cowles dissolver was set at 4 NS fineness. The $TiO_2$ pigment has a reflectance of less than 15 percent in actinic light.

The coatings were tested for strength by rubbing with an acetone soaked cloth until the coatings were damaged and tested for hardness by determining the pencil hardness. The results were as follows:

| Example | Pigment | Acetone Rubs | Pencil Hardness |
| --- | --- | --- | --- |
| 2 | Lithopone | 24 | H |
| 3 | Antimony Oxide | 18 | H |
| Control | $TiO_2$ | 1 | 6B |

It is thus seen that the coatings containing the pigments of this invention were cured to a hard state while the coating containing $TiO_2$ remained soft.

EXAMPLES 5-6

Two actinic light-sensitive compositions containing pigments having a reflectance of greater than 15 percent in actinic light were prepared as follows:

A pigment paste comprising 64 parts of Lithopone pigment and 36 parts of phthalic ehtylene glycol diacrylate was ground in a Cowles dissolver set at 7 NS fineness.

To 94 parts of the above pigment paste were added 25 parts of phthalic ethylene glycol diacrylate and 0.9 part of a mixture of benzoyl butyl ether and benzoyl amyl ether and the composition was drawn on cold-rolled steel using a No. 0.018 wire wound draw bar. The coating was cured by passing under a mercury high pressure ultraviolet lamp in a nitrogen gas atmosphere at a speed of 50 feet per minute for one pass.

A similar coating was made using antimony trioxide as the pigment where the Cowles dissolver was set at 6 ½ NS fineness. These materials wherein the pigments have a reflectance of greater than 15 percent in actinic light were compared to the same coating using $TiO_2$ pigment and using 105 parts of the radiation sensitive material rather than 94 and wherein the Cowles dissolver was set at 4 NS fineness.

The coatings were tested for strength and hardness and the results are given below:

| Example | Pigment | Acetone Rubs | Pencil Hardness |
| --- | --- | --- | --- |
| 4 | Lithopone | 56 | 2H |
| 5 | Antimony Oxide | 52 | 2H |
| Control | $TiO_2$ | 2 | 6B |

EXAMPLES 7-8

Two actinic light-sensitive compositions containing pigments having a reflectance of greater than 15 percent in actinic light were prepared as follows:

A pigment paste comprising 64 parts of Lithopone pigment and 36 parts of a polyester derived from phthalic anhydride, maleic anhydride, propylene glycol and styrene wherein the polyester comprises 88 percent and the styrene comprises 12 percent was ground in a Cowles dissolver set at 7 NS fineness.

To 94 parts of the above pigment paste were added 22 parts of the polyester and 3 parts of styrene and 0.9 part of a mixture of benzoyl butyl ether and benzoyl amyl ether and the composition was drawn down on cold-rolled steel using a No. 0.018 wire wound draw bar. The coating was cured by passing under a mercury high pressure ultraviolet lamp in a nitrogen gas atmosphere at a speed of 50 feet per minute for five passes.

A similar coating was made using antimony trioxide as the pigment wherein the Cowles dissolver was set at 6 ½ NS fineness. These materials wherein the pigments have a reflectance of greater than 15 percent in actinic light were compared to the same coating using $TiO_2$ pigment and using 100 parts of the polyester and 5 parts of the styrene rather than 94 parts of the mixture and using a Cowles dissolver set at 4 NS fineness.

The coatings were tested for strength and hardness and the results are given below:

| Example | Pigment | Acetone Rubs | Pencil Hardness |
| --- | --- | --- | --- |
| 6 | Lithopone | 35 | 2H |
| 7 | Antimony Oxide | 32 | 2H |
| Control | $TiO_2$ | 2 | 6B |

EXAMPLE 9

A porous particle board was impregnated by applying the coating composition of Example 1 by a reverse roll coater and curing by subjecting to ultra-violet light 6 passes at 30 feet per minute. The resulting filled particle board had a uniform surface and a good appearance capable of being topcoated without the use of a ground coat.

The cure was tested by rubbing 50 times with an acetone soaked cloth and the film was found not to have been removed, indicating a complete cure throughout.

Although specific examples have been set forth above, it is not intended that the invention be limited solely thereto, but to include all of the variations and

We claim:

1. The method of curing an actinic light-sensitive composition containing
   a. an actinic light-sensitive resin,
   b. pigments having at least 15 percent reflectance to actinic light having a wavelength somewhere between 2,200 and 3,800 Angstroms, at least a portion of said pigment being a white pigment selected from the group consisting of antimony trioxide, lithopone and lead carbonate, and
   c. from about 0.1 to about 5 percent by weight of photosensitizer wherein the pigment to binder ratio is in the range of from 0.5:1 to 5:1, comprising subjecting said composition to actinic light in the wavelength range of from 2,200 to 3,800 Angstroms to cure said composition.

2. The method of claim 1 wherein the actinic light-sensitive material is a polyacrylate.

3. The method of claim 1 wherein the actinic light-sensitive material is an unsaturated polyester resin.

4. The method of claim 1 wherein the pigments are a blend of indofast yellow pigment, indofast scarlet pigment, graphite, barium sulphate, and lithopone.

5. The method of filling a porous substrate to achieve a uniform surface comprising impregnating and porous substrate with an actinic light-sensitive composition containing
   a. an actinic light-sensitive resin,
   b. pigments having at least 15 percent reflectance to actinic light having a wavelength somewhere between 2,200 and 3,800 Angstroms, at least a portion of said pigment being a white pigment selected from the group consisting of antimony trioxide, lithopone and lead carbonate, and
   c. from about 0.1 to about 5 percent by weight of photosensitizer wherein the pigment to binder ratio is in the range of from 0.5:1 to 5:1, and subjecting the impregnated substrate to actinic light in the wavelength range of from 2,200 to 3,800 Angstroms to cure said composition.

6. The method of claim 5 wherein the substrate is particle board.

7. The method of claim 5 wherein the actinic light-sensitive material is polyacrylate.

8. The method of claim 5 wherein the actinic light-sensitive material is an unsaturated polyester resin.

9. The method of claim 5 wherein the pigments are a blend of indofast yellow pigment, indofast scarlet pigment, graphite, barium sulfate, and lithopone.

10. The filled porous substrate produced by the process of claim 5.

* * * * *

UNITED STATES PATENT OFFICE
CERTIFICATE OF CORRECTION

Patent No. 3,861,945          Dated   January 21, 1975

Inventor(s)  Rowland S. Hartzell et al.

It is certified that error appears in the above-identified patent and that said Letters Patent are hereby corrected as shown below:

Column 9, line 27, after "impregnating", delete "and" and insert -- said --.

Signed and sealed this 22nd day of April 1975.

(SEAL)
Attest:

RUTH C. MASON
Attesting Officer

C. MARSHALL DANN
Commissioner of Patents
and Trademarks